United States Patent [19]

Vietti et al.

[11] Patent Number: 4,717,579

[45] Date of Patent: Jan. 5, 1988

[54] FLOWABLE FROZEN TEA MIX CONCENTRATE WHICH CONTAINS HIGH LEVELS OF SUGAR

[75] Inventors: Michael J. Vietti, Cincinnati; Phillip F. Pflaumer, Hamilton; William J. Brabbs, Cincinnati, all of Ohio

[73] Assignee: The Procter & Gamble Co., Cincinnati, Ohio

[21] Appl. No.: 860,606

[22] Filed: May 7, 1986

[51] Int. Cl.$^4$ ................................ A23F 3/16
[52] U.S. Cl. .................................. 426/597; 426/330.3
[58] Field of Search ............................ 426/330.3, 597

[56] References Cited

U.S. PATENT DOCUMENTS

| | | | |
|---|---|---|---|
| 4,235,936 | 11/1980 | Kahn et al. | 426/597 X |
| 4,332,824 | 6/1982 | Kahn et al. | 426/597 X |
| 4,387,109 | 6/1983 | Kahn et al. | 426/330.3 X |
| 4,539,216 | 9/1985 | Tse | 426/597 |

*Primary Examiner*—Joseph Golian
*Attorney, Agent, or Firm*—Eric W. Guttag; Ronald L. Hemingway; Richard C. Witte

[57] ABSTRACT

Frozen tea mix concentrates which contain high levels of sugar and are flowable at freezer temperatures are disclosed. These tea mix concentrates comprise from about 0.5 to about 2% by weight tea solids and from about 40 to about 70% by weight of a sugar component. This sugar comprises a particular mixture of fructose and dextrose monosaccharides, sucrose, glucose-based di- and tri-saccharides selected from maltose, isomaltose, maltotriose, isomaltotriose and mixtures thereof, plus other polysaccharides commonly present in corn syrups. The tea mix concentrates also preferably include an edible acid to provide a lower pH (about 4 or less at 20° C.), and a flavoring such as lemon.

8 Claims, 1 Drawing Figure

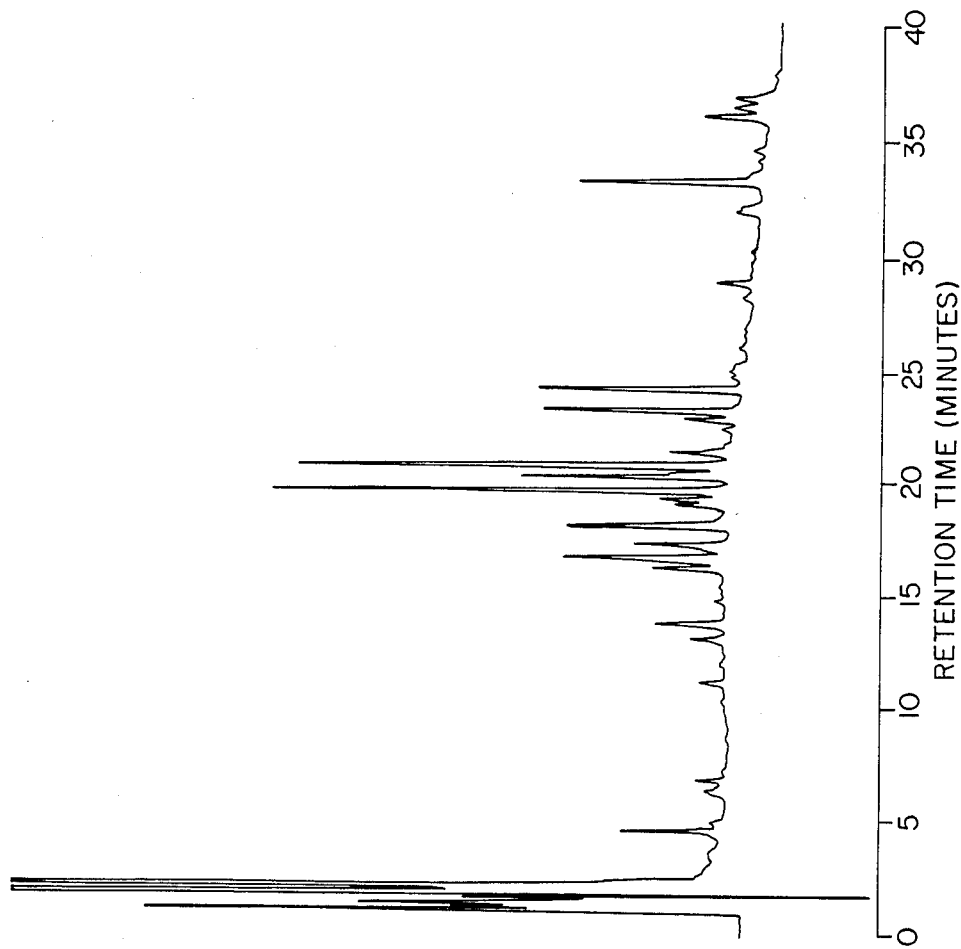

FLOWABLE FROZEN TEA MIX CONCENTRATE WHICH CONTAINS HIGH LEVELS OF SUGAR

TECHNICAL FIELD

The present invention relates to a frozen tea mix concentrate which contains high levels of sugar and is flowable at freezer temperatures.

Tea mix products usually contain a tea extract, a sweetener such as sugar, and an optional flavoring such as lemon. These products are most commonly available in the U.S. as granular instant tea mixes, or as ready-to-drink canned products. Liquid tea mix concentrates are sold primarily to foodservice or institutional customers, rather than directly to the consumer. The concentrates, like instant tea, require the addition of water to prepare a tea beverage for consumption.

Many consumers prefer that the tea beverage have a fresh brewed flavor. Preserving fresh brewed flavor in a liquid tea mix concentrate is difficult. By contrast, freezing the liquid tea mix concentrate would permit the preservation of fresh brewed flavor. Accordingly, consumers would likely prefer a frozen form of a tea mix concentrate for flavor reasons.

Frozen tea mix concentrates containing high levels of sugar are not easy to formulate. Preferably, such frozen concentrates should be flowable (e.g., spoonable), even at freezer temperatures, for ease of use. Also, the tea mix concentrate should deliver a stable, natural sweetness. However, the primary sugar used in sweetening powdered tea mixes is sucrose. Inclusion of sucrose at too high a level in a frozen tea mix concentrate can cause a number of problems. In particular, sucrose can crystallize out of a concentrated tea solution, especially at freezer temperatures. Such crystallization would impede the flowability (spoonability) and homogeneity of a frozen tea mix concentrate and make it less convenient to use.

In addition, at low pH, sucrose can be hydrolyzed to dextrose and fructose which have different sweetness intensities and profiles. Many tea mix concentrates contain a citrus flavoring such as lemon. Such citrus flavored tea mix concentrates often contain an edible acid such as citric acid which significantly lowers the pH of the tea mix in aqueous solution. In addition, a relatively low pH is desirable from the standpoint of stability against microbial growth in case the frozen tea mix concentrate is thawed during distribution or storage.

Fructose, typically as high fructose corn syrup, can be used in place of sucrose in frozen tea mix concentrates to provide flowability at freezer temperatures. Fructose resists crystallization and additionally, when used at high enough levels, inhibits the crystallization of sucrose, even in concentrated tea solutions. However, as mentioned above, fructose has a significantly different sweetness intensity and profile than sucrose which is highly dependent on the product matrix. In addition, fructose does not provide the mouthfeel effects that sucrose does to the resulting tea beverage.

BACKGROUND ART

U.S. Pat. No. 4,235,936 to Kahn et al, issued Nov. 25, 1980, relates to microbiologically stable intermediate-moisture foods, and other products, which are normally maintained at freezer temperatures. These foods are broadly characterized as having a water activity of about 0.75 to 0.90, a sugar to water ratio of about 1:1 and a sugar content which is at least 50% dextrose, fructose, or a combination thereof. One embodiment disclosed is microbiologically stable beverage concentrates, including tea concentrates, which are adapted to flow at about 10° F. These beverage concentrates generally comprise 35–45% water; sugar in a ratio to water of 1.8:1 to 1.2:1; a minor but effective amount of flavoring; 75–100% fructose/dextrose (based on the total sugar content) with the amount of fructose being 10–30%. Examples 3 and 4 of this patent disclose iced tea concentrates where the sugar component is based on a combination of dextrose and an Iso-sweet fructose-dextrose syrup. The sugar component of this Iso-sweet syrup comprises 50% dextrose, 42% fructose, 1.5% maltose, 1.5% iso-maltose, and 5% higher saccharides.

DISCLOSURE OF THE INVENTION

The present invention relates to a frozen tea mix concentrate which contains a relatively high level of sugar. This frozen tea mix concentrate comprises:
  a. from about 0.5 to about 2% by weight tea solids;
  b. from about 40 to about 70% by weight of a sugar component, which comprises, by weight of said sugar component:
    1. from about 20 to about 55% monosaccharides selected from the group consisting of dextrose, fructose and mixtures thereof;
    2. from about 20 to about 55% sucrose;
    3. from about 5 to about 40% glucose-based di- and tri-saccharides selected from the group consisting of maltose, isomaltose, maltotriose, isomaltotriose and mixtures thereof;
    4. from 0 to about 20% other saccharides;
  c. the balance water.

Preferred optional components of this frozen tea mix concentrate are edible acids, such as citric acid, and a flavoring, such as lemon.

The frozen tea mix concentrates of the present invention are flowable at freezer temperatures, even though they contain a relatively high level of sugar. This is achieved by partial substitution of glucose-based di- and tri-saccharides (e.g., maltose, maltotriose) for sucrose. Like fructose, these glucose-based di- and tri-saccharides are resistant to crystallization at freezer temperatures and inhibit the crystallization of sucrose. However, they also provide desirable mouthfeel effects (like sucrose does) in the resulting tea beverage, possibly by balancing the intense early onset of sweetness due to fructose. In addition, the glucose-based di- and tri- saccharides are resistant to hydrolysis at low pH, especially in tea mix concentrates which contain edible acids such as citric acid.

BRIEF DESCRIPTION OF THE DRAWING

The FIGURE represents an HPLC chromatograph of the polyphenols present in an ice tea beverage prepared from a frozen tea mix concentrate made according to the present invention.

A. Definitions

As used herein, the term "tea mix concentrate" refers to a concentrated tea product containing tea solids, sugar and other optional components typically included in a tea mix such as edible acids, flavoring, coloring, etc. which is diluted with water to form a drinkable tea beverage. Tea mix concentrates of the present invention comprise from about 0.5 to about 2% tea solids. Preferred tea mix concentrates of the present invention comprise from about 0.8 to about 1.2% by weight tea solids.

As used herein, the term "frozen tea mix concentrate" refers to a tea mix concentrate which has a plastic, flowable (e.g., pourable or easily spoonable) consistency at freezer temperatures.

As used herein, the term "tea beverage" refers to a drinkable beverage prepared from the frozen tea mix concentrates of the present invention by dilution with water. The tea mix concentrates of the present invention are generally diluted with from about 2 to about 10 parts water to provide the tea beverage. Preferred tea concentrates are typically diluted with from about 4 to about 7 parts water to provide the tea beverage.

As used herein, the term "tea solids" refers to those solids normally present in tea. Polyphenolic compounds are normally the primary component of tea solids. However, tea solids can also include caffeine, theobromine, proteins, amino acids, and carbohydrates.

As used herein, the term "sugar" refers to those saccharides which are based on fructose molecules, glucose molecules and combinations thereof. The sugars used in the frozen tea mix concentrates of the present invention typically include the monosaccharides, such as fructose and dextrose (glucose), the disaccharides such as sucrose, maltose and isomaltose, tri-saccharides such as maltotriose, and isomaltotriose and other polysaccharides normally present in corn syrups.

As used herein, the term "comprising" means various components can be conjointly employed in the tea concentrates of the present invention. Accordingly, the term "comprising" encompasses the more restrictive terms "consisting essentially of" and "consisting of".

B. Frozen Tea Mix Concentrates

1. Sugar Component

In addition to the tea solids, the key ingredient of the frozen tea mix concentrates of the present invention is the sugar component. This sugar component comprises from about 40 to about 70% by weight of the tea mix concentrate. If the sugar component is present in an amount much above about 70% by weight, the viscosity of the tea mix concentrate is too high to be easily pourable or spoonable. If the sugar component is present at a level much below about 40% by weight, the level of total solids is low enough such that the tea mix concentrate tends to freeze into a solid, non-flowable form. Preferably, the sugar component comprises from about 55 to about 65% by weight of the frozen tea mix concentrate.

The sugar component of the tea mix concentrates of the present invention is based on a unique mixture of saccharides. A key group of saccharides present in the sugar component are the glucose-based di- and tri-saccharides selected from maltose, isomaltose, maltotriose, isomaltotriose, and more typically mixtures thereof. These glucose-based di- and tri-saccharides are resistant to crystallization in concentrated tea solutions at freezer temperatures. These glucose-based saccharides also inhibit the crystallization of sucrose at such temperatures. Accordingly, this makes these saccharides particularly useful in assuring flowability of the frozen tea mix concentrates of the present invention. In addition, these glucose-based saccharides provide desirable, thicker mouthfeel and body effects to resulting tea beverage. These mouthfeel effects are somewhat akin to those provided by sucrose.

The glucose-based di- and tri-saccharides comprise from about 5 to about 40% by weight of the sugar component. At levels much above about 40% by weight, the glucose-based di- and tri-saccharides provide too thick a mouthfeel and too low a sweetness intensity to the resulting tea beverage. At levels much below about 5% by weight, these glucose-based di- and tri-saccharides are present at too low a level to provide much of a crystallization-inhibiting effect to sucrose. Preferably, the glucose-based di- and tri-saccharides comprise from about 10 to about 25% by weight of the sugar component.

Another important saccharide present in the sugar component is sucrose. Sucrose provides desirable mouthfeel effects, as well as a desirable sweetness intensity and sweetness profile. However, at too high a level sucrose can crystallize out of concentrated tea solutions. In addition, sucrose can be hydrolyzed at relatively low pHs typically present in tea mix concentrates which contain an edible acid.

Accordingly, sucrose comprises from about 20 to about 55% by weight of the sugar component. At a level much below about 20%, there is insufficient sucrose to provide a sufficiently intense sweetness and acceptable sweetness profile in the resulting tea beverage. At levels much above about 55% by weight, the level of sucrose is so high as to cause the above negative effects with regard to crystallization and hydrolysis. Preferably, sucrose comprises from about 25 to about 40% by weight of the sugar component.

The next group of saccharides present in the sugar component are the monosaccharides selected from dextrose, fructose and typically mixtures of fructose and dextrose. Generally, these monosaccharides comprise from about 20 to about 55% by weight of the sugar component. If much less than about 20% by weight of these monosaccharides are used, a high level (above about 40%) glucose-base di- and tri-saccharides are required to prevent crystallization of the sucrose. Such a high level of glucose-based saccharides provides too thick a mouthfeel and too low a sweetness intensity in the resulting tea beverage. At levels much above about 55% by weight monosaccharides, the resulting tea beverage can have a relatively low sweetness intensity (at high levels of dextrose), a more biting, less sucrose-like sweetness (at high levels of fructose), and a much thinner mouthfeel. In addition, although dextrose is more crystallization-resistant than sucrose, dextrose (at high levels) can crystallize out of concentrated tea solutions during prolonged storage at freezer temperatures. Accordingly, it may be desirable to limit the amount of dextrose present in the monosaccharides. Preferably, the monosaccharides comprise from about 25 to about 45% by weight of the sugar component.

Besides the monosaccharides, sucrose, and glucose-based di- and tri-saccharides, the sugar component can contain other saccharides. These other saccharides typically comprise those polysaccharides normally present in corn syrups, such as the tetra-, penta- and higher saccharides. These other saccharides are present in the sugar component in an amount of from 0 to about 20% by weight. These other saccharides can provide a thicker mouthfeel and balance the intense, early onset of sweetness due to fructose in the resulting tea beverage. However, at too high a level (i.e. above about 20%), these other saccharides provide too thick a mouthfeel and too low a sweetness intensity. Preferably, these other saccharides are present in an amount of from about 3 to about 10% by weight.

The sugar component can be formulated from the individual sugars. However, this sugar component is typically obtained by blending together high fructose corn syrup, high maltose corn syrup or certain conventional corn syrups, and sucrose. Suitable high fructose corn syrups contain 42% fructose, 55% fructose or most preferably 90% fructose on a sugar solids basis. Suitable high maltose corn syrups and conventional corn syrups contain from about 30 to about 75% combined maltose, isomaltose, maltotriose and isomaltotriose on a sugar solids basis. Examples of suitable high maltose corn syrups are Neto® 7300 and 7350 (from A. E. Staley Manufacturing Co.). Examples of suitable conventional corn syrups are Amaizo® 54 and 62 (from American Maize Products Company). Sugar components of the present invention can typically be prepared from blends of from about 20 to about 55% high fructose corn syrup, from about 5 to about 50% high maltose corn syrup and from about 20 to about 55% sucrose on a sugar solids basis.

2. Acids, Flavorings and Other Ingredients

A preferred component of the frozen tea mix concentrates of the present invention is an edible acid. Suitable edible acids include foodgrade organic or inorganic acids, or combinations of these acids. Edible organic acids which can be used include fumaric, citric, malic, acetic, lactic, propionic, adipic, tartaric, succinic, and the like. Edible inorganic acids which can be used include phosphoric, carbonic, sodium hydrogen phosphate, and the like. Preferred edible acids for use herein are citric, malic, or phosphoric acid.

The edible acid is present in an amount effective to provide a pH of about 4 or less at 20° C. in the tea mix concentrate. Preferably, the edible acid is included in an amount sufficient to provide a pH of about 3 or less at 20° C. The typical pH range for frozen tea mix concentrates of the present invention is from about 2.4 to about 2.8 at 20° C. Typically, the edible acid is present in the frozen tea mix concentrate of the present invention in an amount of from about 0.1 to about 5% by weight and preferably in an amount of from about 1 to about 2% by weight for citric acid.

Another preferred component of the frozen tea mix concentrates of the present invention is an effective amount of a flavoring material. Any of a wide variety of natural or synthetic flavorings can be used. Preferred flavorings are citrus flavors such as lemon, orange, and the like. The flavoring is used in an amount effective to provide the desired flavoring characteristics. This amount depends upon the flavor effects desired and the particular flavoring material used. A particularly preferred lemon flavoring is lemon oil.

Various other ingredients are also suitable for use in the frozen tea mix concentrates of the present invention. These other ingredients include preservatives such as benzoates, sorbates, or parabens. Also suitable for inclusion are chelating agents such as ethylenediaminetetraacetic acid (EDTA) or polyphosphates such as sodium metaphosphate, sodium pyrophosphate, tetrasodium pyrophosphate, sodium tripolyphosphate, potassium tripolyphosphate, tetrapotassium polyphosphate, tetrasodiummonopotassium tripolyphosphate, and hexaphos (sodium hexametaphosphate). Inclusion of these agents aids in maintaining tea beverage clarity in hard water and also permits the use of lower levels of preservatives.

3. Tea Flavor, Cold Water Solubility and Turbidity Properties

The tea mix concentrates of the present invention preferably provide tea beverages having a polyphenolic profile similar to that of fresh brewed tea. The principle polyphenols in tea are the theaflavins and the thearubigins. The ratio of thearubigins to theaflavins is a way to measure tea flavor. Preferred frozen tea mix concentrates of the present invention provide tea beverages having a thearubigin to theaflavin ratio of from about 4 to about 8. By comparison, standard fresh brewed teas have a ratio from about 3 to about 10. This ratio is based on the polyphenolic profile of the tea concentrate (or resulting tea beverage) obtained by high pressure liquid chromatography (HPLC) according to a method described hereafter.

The similarity of the flavor profile of the frozen tea mix concentrates of the present invention to freshly brewed tea is illustrated by the HPLC chromatograph in the Figure and especially the thearubigin to theaflavin ratios defined by this chromatograph. FIG. 1 represents the HPLC chromatograph of a drinking strength iced tea beverage prepared from a frozen tea mix concentrate made similar to Embodiment 1 of the present invention. The retention time (minutes) and area under the curve for each peak of this chromatograph are as follows:

| Retention Time | Area |
|---|---|
| .98 | 3739 |
| 1.12 | 2968 |
| 1.25 | 6575 |
| 1.57 | 3314 |
| 1.69 | 17856 |
| 2.05 | 10025 |
| 2.50 | 54 |
| 3.45 | 69 |
| 3.65 | 109 |
| 4.32 | 53 |
| 4.51 | 1775 |
| 4.91 | 186 |
| 6.28 | 1011 |
| 6.67 | 739 |
| 7.14 | 131 |
| 10.27 | 191 |
| 10.74 | 42 |
| 11.03 | 459 |
| 11.84 | 208 |
| 12.48 | 46 |
| 12.96 | 940 |
| 13.62 | 1702 |
| 14.10 | 61 |
| 14.41 | 41 |
| 14.66 | 400 |
| 15.07 | 183 |
| 15.35 | 558 |
| 16.13 | 2280 |
| 16.60 | 5165 |
| 17.21 | 3256 |
| 18.01 | 5516 |
| 19.00 | 1406 |
| 19.21 | 1857 |
| 19.60 | 11290 |
| 20.23 | 6493 |
| 20.75 | 11552 |
| 21.34 | 2848 |
| 21.83 | 497 |
| 22.11 | 391 |
| 22.44 | 711 |
| 22.89 | 1444 |
| 23.21 | 5078 |
| 24.18 | 5309 |
| 24.85 | 525 |
| 25.11 | 712 |
| 25.90 | 108 |
| 26.22 | 528 |
| 26.81 | 243 |
| 27.10 | 385 |

-continued

| Retention Time | Area |
| --- | --- |
| 27.89 | 51 |
| 28.37 | 459 |
| 29.00 | 1012 |
| 29.40 | 201 |
| 29.82 | 239 |
| 30.36 | 427 |
| 31.43 | 106 |
| 32.15 | 1331 |
| 33.41 | 6034 |
| 34.37 | 385 |
| 34.78 | 786 |
| 35.44 | 400 |
| 36.14 | 2469 |
| 36.59 | 1753 |
| 37.01 | 1726 |
| 38.10 | 128 |
| 40.86 | 46 |

The peaks at retention times 16.13 through 24.18 minutes are believed to represent the thearubigins and provide a total area of 65,093. The peaks at retention times 33.41 through 37.01 minutes are believed to represent the theaflavins and provide a total area of 13,553. The ratio of these total areas is 4.8.

The frozen tea mix concentrates of the present invention are generally cold water soluble. As used herein, the term "cold water soluble" refers to a tea mix concentrate which is substantially soluble in water having a temperature of about 20° C. or less. The resulting tea beverages are essentially clear. In particular, frozen tea mix concentrates of the present invention provide tea beverages having a turbidity of less than about 50 neophelometrics units (herein NTU). Typically, the resulting tea beverages have turbidity values of from about 15 to about 35 NTU. (Turbidity values for the tea beverages resulting from these tea mix concentrates are measured by the analytical method described hereafter.)

C. Method for Making Frozen Tea Mix Concentrate

The source of tea solids for the frozen tea mix concentrates of the present invention can be powdered instant tea or more typically a tea extract. The tea extracts used can be obtained from fermented or unfermented tea, e.g., black tea, oolong tea, green tea, or mixtures thereof. Typically, the tea extract is obtained from about 85 to 100% black tea leaves and from 0 to about 15% green tea leaves. When black tea is used in preparing the tea extract, it can be enzymatically pretreated according to the method described in European Patent Application No. 135,222 to C. H. Tsai, published May 27, 1985, which is incorporated by reference. In the Tsai method, black tea leaves are wetted with water containing tannase and one or more cell-wall-digesting enzymes, such as cellulase, pectinase, or hemicellulase prior to extraction. The enzyme-moistened tea leaves are incubated in a closed system at room temperature for a few hours, neutralized with a suitable foodgrade base and then heated to inactivate the enzymes. The resulting enzyme-treated tea leaves provide a higher yield of tea extract which has better solubility in cold water.

The tea leaves, with or without pretreatment with enzymes, can then be extracted in a conventional manner to provide the tea extract. See Pintauro, *Tea and Soluble Tea Products Manufacture* (1977), pp. 39-81 (herein incorporated by reference), for various methods of obtaining tea extract from tea leaves. The tea leaves are typically slurried with water followed by separation of the leaves from the resulting tea extract. This extraction can be performed in a single batch fashion, as a continuous process, as a countercurrent multiple vessel process, or any combination thereof. Continuous countercurrent tea extraction is the most preferred method. The previously described chelating agents such as EDTA and the polyphosphates can be added to the extraction water to sequester undesirable minerals such as calcium and magnesium typically present in hard water and tea leaves. If desired, tea aroma and flavor components can be volatilized from the extract, collected, condensed and added back at a later point in the process. Also, the tea desorbate process disclosed in U.S. Pat. No. 4,220,673 to Strobel, issued Sept. 2, 1980 (herein incorporated by reference), can be used to provide the tea extract. A tea extraction process which avoids harsh tea flavors and preserves real tea flavor is desirable.

The tea extract resulting from slurry or countercurrent extraction of tea leaves produces a turbid beverage when diluted with cold water. Typically, the tea extract is cooled to separate solids which form in a decreasing step. Solids which are precipitated by cooling consist chiefly of tannins or tea creams resulting from the formation of complexes of polyphenolic compounds and caffeine. Removal of tea creams is typically achieved by centrifugation, filtration or other suitable means. Depending upon the desired tea solids concentration in the tea mix concentrate, the clarified extract can be further concentrated by suitable methods such as evaporation or reverse osmosis. See Pintauro, supra, pp. 82-141 (herein incorporated by reference), for various representative methods for decreaming, filtering and concentrating tea extracts.

After clarification and any appropriate processing to provide the desired level of tea solids in the extract, the sugars and edible acids are added to provide the tea mix concentrate. This tea mix concentrate is preferably pasteurized or sterilized prior to packing in sterile containers. Any flavoring, such as lemon oil, is added to this sterilized tea mix concentrate, which is then chilled to provide a frozen tea mix concentrate product.

D. Analytical Methods

The following analytical methods are used in the present application to evaluate the polyphenolic profile and turbidity properties of tea concentrates or tea beverages.

1. Polyphenols

The polyphenols present in the tea concentrates or tea beverages are analyzed using a modification of the high pressure liquid chromatography procedure described by Hoefler and Coggon, *Journal of Chromatography*, Vol. 129, (1976), pp. 460-463.

A DuPont model 8800 liquid chromatographic system (manufactured by DuPont Company, Analytical Instrument Division, Wilmington, DE 19898) with a variable wavelength ultraviolet spectrophotometric detector set at 380 nm is used. Samples are injected onto a chromatographic column using a Dynatech Precision Sampling model LC-241 autosampler (available from Dynotech Precision Sampling, Baton Rough, LA 70895). A high pressure liquid chromatographic column, Supelco LC-18 3 um ODS, 15 cm×4.6 mm (available from Supelco Inc., Bellefonte, PA 16823) is used. Chromatographic peaks are recorded using a Spectra-Physics model 4290 recording integrator (available from Spectra-Physics, 3333 N. First St., San Jose, CA 95134). Peak integration is accomplished using a Hewlett-Packard model 1000 computer (available from Hewlett-Packard, 1820 Embarcadero Rd., Palo Alto, CA 94303).

A binary mobile phase system is used. Mobile phase A consists of 0.24% glacial acetic acid in Milli-Q water (water purified in a Milli-Q Purification Unit, available from Millipore Corp. of Bedford, MA 01730). Mobile phase B consists of 50% of 0.24% glacial acetic acid in Milli-Q water and 50% acetone (HPLC grade), available from Burdick & Jackson, 1953 S. Harvey St., Muskegon, MI 49442.

Samples are eluted in four timed solvent segments: (1) an isocratic segment of 80% mobile phase A and 20% mobile phase B for 2 minutes; (2) a linear gradient from 75% mobile phase A:25% mobile phase B to 25% mobile phase A:75% mobile phase B in 30 minutes; (3) an isocratic segment of 10% mobile phase A and 90% mobile phase B for 8 minutes; and (4) an isocratic segment of 80% mobile phase A and 20% mobile phase B for 1 minute.

Tea solutions containing carbohydrates soluble in the mobile phase system are first made to drinking strength. An approximate volume of 2 ml is filtered through a 0.45 um cellulose-acetate disposable filter, Millex HA, 25 mm diameter, available from Millipore Corp., Bedford, MA 01730. A 50 ul injection of the filtered solution is made.

2. Turbidity

The nephelometric method and nephelometric turbidity unit, as described in "Standard Methods for the Examination of Water and Waste Water", 14th ed., published by American Public Health Association, Washington, D.C., is used to determine the cloudiness or turbidity of the tea beverages. A Hach Ratio Turbidimeter, Model 18900-00, available from Hach Chemical Company, Loveland, Col., is employed. It is calibrated prior to each measurement using Latex Standard solutions provided by Hach Chemical Company. For refrigerated beverages, the turbidity is measured at the refrigerated temperature, i.e. 45° F. (7° C.). Three different samples from each beverage are measured and averaged.

E. Specific Embodiments of Tea Mix Concentrates of Present Invention

The following specific embodiments are used to illustrate the frozen tea mix concentrates of the present invention:

EMBODIMENT 1

A frozen tea mix concentrate is prepared as follows:

A blend of 90% black tea leaves (Tender Leaf® blend) and 10% Taiwanese green tea fannings is fed to a Niro® countercurrent extractor (Model A27) at a rate of 0.33 lbs./min. (0.15 kg/min.). Distilled water is treated with 0.02% sodium hexametaphosphate and fed into the extractor at a flow rate and temperature of 3.5 lbs./min. (1.6 kg/min.) and 180° F. (82.2° C.), respectively. The extract is cooled to a temperature of 124° F. (51.1° C.) at the discharge port of the extractor. The extract is passed through a No. 200 (A.S.T.M. Standard) filter screen. This extract has a tea solids concentration of 4.65%.

The extract is cooled to 85° F. (29.4° C.) and fed to a continuous centrifuge (West Falia Separator Type SA-14-47-076) after a 30 minute hold time at 85° F. (29.4° C.). The centrifuge is operated at 7560 rpm. After clarification, the tea solids concentration is 4.2%.

420 lbs. (190.9 kg.) of this clarified brewed tea extract is blended with 49.4 lbs. (22.5 kg.) of distilled water, 297.6 lbs. (135.3 kg.) of a NETO® 7350 high maltose corn syrup (10% dextrose, 42% maltose, 22% maltotriose, 26% other polysaccharides), 470.4 lbs. (213.8 kg.) of high fructose corn syrup (90% fructose), 336 lbs. (152.7 kg.) of sucrose granules, 24 lbs. (10.9 kg.) of citric acid, 2.56 lbs. (1.2 kg.) of caramel color, and 18.87 g. of artificial food color, and then pasteurized. Fifteen hundred (1500) lbs. of this pasteurized product is blended with 51.71 g. of lemon oil, packaged and then frozen. This frozen tea mix concentrate contains 1.1% tea solids and 58.6% of a sugar component comprising 40% total monosaccharides (5% dextrose, 35% fructose), 35% sucrose, 17% combined maltose and maltotriose, and 8% other saccharides.

EMBODIMENT 2

A frozen tea mix concentrate is prepared as follows: 1450 g. of an Ultra High Temperature (UHT) sterilized brewed tea extract having a temperature of 90° F. (32.2° C.) is blended with 570 g. of NETO® 7350 high maltose corn syrup, 1810 g. of high fructose corn syrup (55% fructose), 1240 g. of granular sucrose, 75 g. of granular citric acid, 9 g. of caramel color, and a small amount of lemon oil. This tea mix concentrate is packaged and then frozen. This frozen tea mix concentrate contains 1.1% tea solids and 60% of a sugar component comprising 45% combined monosaccharides (20% dextrose, 25% fructose), 40% sucrose, 10% combined maltose and maltotriose, and 5% other saccharides.

EMBODIMENTS 3 TO 17

Frozen tea mix concentrates are prepared similar to Embodiment 1 by substituting other sugar components prepared from various blends of a NETO® 7350 high maltose corn syrup (8% dextrose, 44% maltose, 23% maltotriose, 25% other polysaccharides), high fructose corn syrup (42% fructose, 52% dextrose, 3% maltose, 3% other polysaccharides) and granular sucrose. These blends (sugar solids basis) are as follows:

| Embod-iment | % of Sugar Component | | |
|---|---|---|---|
| | NETO® 7350 | HFCS-42 | Sucrose |
| 3 | 35 | 35 | 30 |
| 4 | 30 | 40 | 30 |
| 5 | 40 | 40 | 20 |
| 6 | 40 | 30 | 30 |
| 7 | 50 | 30 | 20 |
| 8 | 32 | 23 | 45 |
| 9 | 22 | 33 | 45 |
| 10 | 10 | 45 | 45 |
| 11 | 15 | 50 | 35 |
| 12 | 15 | 40 | 45 |
| 13 | 30 | 25 | 45 |
| 14 | 30 | 35 | 35 |
| 15 | 30 | 45 | 25 |
| 16 | 35 | 20 | 45 |
| 17 | 35 | 40 | 25 |

The saccharide composition of these blends is as follows:

| Embod-iment | % of Sugar Component | | | |
|---|---|---|---|---|
| | Monosacc. | Sucrose | Di-/Tri-Malto | Other |
| 3 | 35.7 | 30.0 | 24.5 | 9.8 |
| 4 | 40.0 | 30.0 | 21.3 | 8.7 |
| 5 | 40.8 | 20.0 | 28.0 | 11.2 |
| 6 | 31.4 | 30.0 | 27.7 | 10.9 |
| 7 | 32.2 | 20.0 | 34.4 | 13.4 |

-continued

| Embodiment | % of Sugar Component | | | |
|---|---|---|---|---|
| | Monosacc. | Sucrose | Di-/Tri-Malto | Other |
| 8 | 24.2 | 45.0 | 22.1 | 8.7 |
| 9 | 32.8 | 45.0 | 15.7 | 6.5 |
| 10 | 43.1 | 45.0 | 8.1 | 3.8 |
| 11 | 48.2 | 35.0 | 11.6 | 5.2 |
| 12 | 38.8 | 45.0 | 11.2 | 5.0 |
| 13 | 25.9 | 45.0 | 20.8 | 8.3 |
| 14 | 35.3 | 35.0 | 21.2 | 8.5 |
| 15 | 44.7 | 25.0 | 21.4 | 8.9 |
| 16 | 21.6 | 45.0 | 24.0 | 9.4 |
| 17 | 40.4 | 25.0 | 24.6 | 10.0 |

EMBODIMENTS 18 TO 22

Frozen tea mix concentrates are prepared similar to Embodiment 1 by substituting other sugar components prepared from various blends of Amaizo ® 62 corn syrup (35.5% dextrose, 31.5% maltose, 14% maltotriose, 19% other polysaccharides), high fructose corn syrup (55% fructose, 41% dextrose, 2% maltose, 2% other polysaccharides) and granular sucrose. These blends (sugar solids basis) are as follows:

| Embodiment | % of Sugar Component | | |
|---|---|---|---|
| | Amaizo ® 62 | HFCS-55 | Sucrose |
| 18 | 30 | 40 | 30 |
| 19 | 30 | 30 | 40 |
| 20 | 25 | 30 | 45 |
| 21 | 35 | 30 | 35 |
| 22 | 35 | 25 | 40 |

The saccharide composition of these blends is as follows:

| Embodiment | % of Sugar Component | | | |
|---|---|---|---|---|
| | Monosacc. | Sucrose | Di-/Tri-Malto | Other |
| 18 | 49.0 | 30.0 | 14.5 | 6.5 |
| 19 | 39.4 | 40.0 | 14.3 | 6.3 |
| 20 | 37.7 | 45.0 | 12.0 | 5.3 |
| 21 | 41.2 | 35.0 | 16.5 | 7.3 |
| 22 | 36.4 | 40.0 | 16.4 | 7.2 |

What is claimed is:
1. A frozen tea mix concentrate, which comprises:
 a. from about 0.5 to about 2% by weight tea solids;
 b. from about 40 to about 70% by weight of a sugar component, which comprises, by weight of said sugar component:
  1. from about 25 to about 45% monosaccharides selected from the group consisting of dextrose, fructose and mixtures thereof;
  2. from about 20 to about 55% sucrose;
  3. from about 10 to about 25% glucose-based di- and tri-saccharides selected from the group consisting of maltose, isomaltose, maltotriose, isomaltotriose, and mixtures thereof;
  4. from 0 to about 20% other saccharides;
 c. the balance water.
2. The frozen concentrate of claim 1 which comprises from about 55 to about 65% by weight of said sugar component.
3. The frozen concentrate of claim 2 which comprises from about 0.8 to about 1.2% by weight tea solids.
4. The frozen concentrate of claim 2 which has a pH of about 4 or less and which further comprises an edible acid.
5. The frozen concentrate of claim 4 wherein said edible acid is citric acid and wherein said pH is about 3 or less.
6. The frozen concentrate of claim 2 which further comprises an effective amount of a flavoring.
7. The frozen concentrate of claim 6 wherein said flavoring comprises lemon.
8. The frozen concentrate of claim 2 wherein said sucrose comprises from about 25 to about 40% of said sugar component.

* * * * *